United States Patent
Raghoebardajal

(10) Patent No.: US 10,545,572 B2
(45) Date of Patent: Jan. 28, 2020

(54) MOTION TRACKING APPARATUS AND SYSTEM

(71) Applicant: Sony Interactive Entertainment Europe Limited, London (GB)

(72) Inventor: Sharwin Winesh Raghoebardajal, London (GB)

(73) Assignee: Sony Interactive Entertainment Europe Limited (GB)

( * ) Notice: Subject to any disclaimer, the term of this patent is extended or adjusted under 35 U.S.C. 154(b) by 31 days.

(21) Appl. No.: 15/900,962

(22) Filed: Feb. 21, 2018

(65) Prior Publication Data
US 2018/0239421 A1    Aug. 23, 2018

(30) Foreign Application Priority Data

Feb. 21, 2017  (GB) .................................. 1702783.0

(51) Int. Cl.
| | | |
|---|---|---|
| *G06F 3/01* | (2006.01) | |
| *G06F 3/0346* | (2013.01) | |
| *G06K 9/00* | (2006.01) | |

(52) U.S. Cl.
CPC ............ *G06F 3/012* (2013.01); *G06F 3/0346* (2013.01); *G06K 9/00355* (2013.01)

(58) Field of Classification Search
CPC ...... G06F 3/012; G06F 3/0346; A63F 13/211; A63F 13/212; A63F 13/213; A63F 13/428; A63F 13/235; G06K 9/00355
See application file for complete search history.

(56) References Cited

U.S. PATENT DOCUMENTS

| | | | |
|---|---|---|---|
| 2009/0209343 A1 | 8/2009 | Foxlin et al. | |
| 2010/0164862 A1* | 7/2010 | Sullivan | ............... G06K 9/3216 345/156 |
| 2010/0194879 A1* | 8/2010 | Pasveer | ............... A61B 5/1127 348/135 |
| 2010/0238168 A1 | 9/2010 | Kim et al. | |
| 2016/0140764 A1* | 5/2016 | Bickerstaff | .......... G02B 27/017 345/633 |

FOREIGN PATENT DOCUMENTS

| | | |
|---|---|---|
| GB | 2466714 A | 7/2010 |
| WO | 2009007917 A2 | 1/2009 |

OTHER PUBLICATIONS

Combined Search and Examination Report for GB1702783.0 dated Aug. 1, 2017.

* cited by examiner

*Primary Examiner* — Lisa S Landis
(74) *Attorney, Agent, or Firm* — Lerner, David, Littenberg, Krumholz & Mentlik, LLP

(57) ABSTRACT

A motion tracking system for tracking a user is provided. The system includes a motion detecting unit, a camera, a body tracking unit and a data merging unit. The motion detecting unit is operable to generate motion information for a user from input signals. The camera is operable to capture images of the user. The body tracking unit is operable to generate tracking information for a user by using the images of the user captured by the camera. And the data merging unit is operable to merge the generated tracking information and the generated motion information. The motion information is used to modify the tracking information.

15 Claims, 2 Drawing Sheets

MOTION TRACKING APPARATUS AND SYSTEM

CROSS REFERENCE TO RELATED APPLICATIONS

The present application claims the benefit of and priority to GB Application No. 1702783.0, filed Feb. 21, 2017, the entire disclosure of which is incorporated by reference herein.

BACKGROUND OF THE INVENTION

Field of the Invention

This invention relates to a motion tracking apparatus and system.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It has become increasingly common for games or applications to make use of a user's body motion as an input. This is particularly useful for virtual reality (VR) or augmented reality (AR) applications using head-mountable displays (HMDs), in which a more immersive experience is desirable—by tying inputs to a user's natural motions rather than an input device, the user may feel more immersed in the virtual or augmented environment. For example, an avatar in a game may move their body in the same manner as the user.

To capture body motion information, some previously proposed arrangements make use of a camera that is operable to capture video or successive images of a user. The captured images or video may then be the subject of image processing to identify a user's motion over time. A problem associated with such arrangements is in that there may be a high latency introduced to the system. For example, cameras often capture images at 30 frames per second (fps); while this may be suitable for many purposes, with the additional delay caused by performing processing and rendering in response to these images there may be too great a latency for satisfactory performance in a number of applications, including VR.

This is especially true as display frame rates increase, such that the image presented to the user may be updated at 60 or 120 Hz. This means that the image presented to the user is updated 2 or 4 times for each measurement of the body position, if the tracking is performed using a 30 fps camera. Simply increasing the frame rate of the captured video may not be suitable for many arrangements, as this increases the processing overheads associated with the tracking substantially and may still be subject to sufficient latency due to the processing needing to be performed.

Alternatively, some embodiments may make use of peripherals that are held or worn by the user that are able to provide position or motion data independently of a camera system. These will often provide a lower latency of position detection relative to that of a camera-based system; however they provide a limited amount of information in terms of the position of the user's body as a whole. This is because a user is often only provided with one or two such peripherals, which is insufficient to provide information about the whole of the user's body. Peripheral-based tracking systems are therefore usually only used when information about the motion of only the user's hands is desired.

SUMMARY OF THE INVENTION

Various aspects and features of the present invention are defined in the appended claims and within the text of the accompanying description and include at least an apparatus and a method, as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
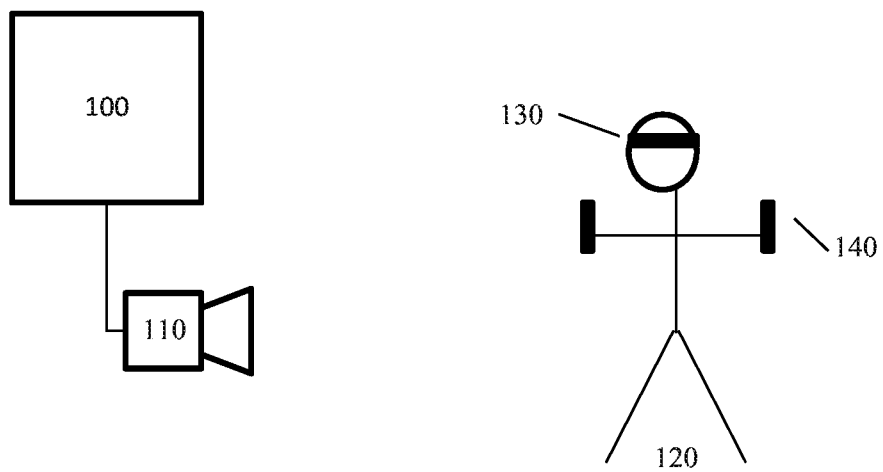
FIG. 1 schematically illustrates a body tracking arrangement.

Referring now to the drawings, wherein like reference numerals designate identical or corresponding parts throughout the several views, FIG. 1 shows an example use of a body tracking arrangement. In this arrangement, a camera 110 is associated with a processing device 100, and is arranged so as to capture images of the user 120. The user 120 is wearing an HMD 130 and using handheld peripherals 140. The HMD 130 and peripherals 140 are operable to provide motion and/or position data to the processing device 100, for example, by the use of accelerometers.

While the user is shown to be wearing an HMD 130, this should not be regarded as essential; the methods described are equally applicable in the absence of an HMD. The HMD 130 is illustrated here as a further example of a device that may provide motion or position information to the processing device 100. The HMD 130 could be replaced by a different wearable motion detector, or simply removed from the system, so long as an alternative display is provided.

Equally, the number or form of the peripherals 140 shown in FIG. 1 should not be regarded as being limiting. The peripherals may take any suitable form, and may be worn by the user rather than held (for example, armbands or the like that are affixed to the user's body). The number of peripherals may be increased or decreased as appropriate; while a greater number provides more information for the locating of the user, this increases the peripheral cost and amount of processing associated with doing so.

A camera-based tracking system may employ a skeletal tracking method. This represents a user by the relative positions of a predetermined set of joints (or indeed other body parts) and monitors the positions of the joints over time in order to affect a tracking of the user. To assist the tracking, the joints may be provided with markers or in some way highlighted so as to make them easier to identify in captured images. In one example, the wrist, elbow, and shoulder joints could be used to represent the position of a user's arm.

In addition to the monitoring of the position of the user's joints, the tracking system may employ a prediction method so as to reduce the time required for the tracking processing. By using information about the tracked joints (for example, the normal range of motion a user's elbow) predictions can be made about the location of the user's arm in subsequent frames. Such a prediction method may mitigate the problem of the low frame rate of the camera, but generally is not sufficient to provide a tracking with a latency that is suitable for VR applications.

In order to provide a tracking method that is suitable for use with VR applications, the present arrangement uses a combination of the camera-based tracking and tracking information from peripherals. As noted above, peripherals may have a much lower latency than that associated with the camera-based tracking and as such may be useful in providing a tracking method with a reduced latency.

In this method, a skeletal model as described above is generated and updated using images of the user captured by a camera 100. However, in the present arrangement, parts of the skeletal model may be updated independently of (or in addition to) updates using the camera-based system. This is performed by using signals obtained from the peripherals, the signals relating to the position or motion of the parts of the user's body with which the peripherals are associated. In some embodiments, the signals provided by the peripherals entirely replace tracking for a portion of a user's body.

It may be advantageous if the input signals (those received from one or more peripheral devices associated with a part of the user's body that indicate motion of the user's body) are received at a different rate to that at which the camera is operable to capture images of the user; in particular, at a higher rate so as to update the body tracking information from the camera-based system more frequently.

In one example, a handheld peripheral is used to provide updates as to the location of a user's wrist; which in turn could be used to update the position of the user's arm. The peripheral may be operable to provide information about the orientation of the body part; for example, by measuring a rotation, or by being able to determine the orientation of the peripheral. The peripherals may also comprise markers or some other recognisable feature so as to assist with the camera-based tracking method.

Figure 2:
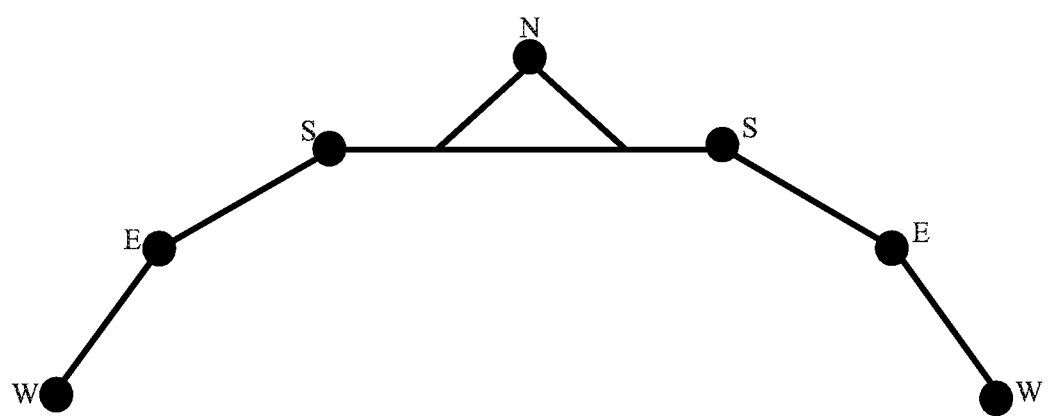
FIG. 2 schematically illustrates a kinematic model.

FIG. 2 schematically illustrates a portion basic kinematic model that relates motion of a neck (N), shoulders (S), elbows (E), and wrists (W). More extensive models could comprise a greater portion (or the whole) of the user's body, and comprise a greater number of joints (for example, knees if the model extended to the user's legs). Alternatively, or in addition, the model could relate to a same portion of the user's body but with a greater resolution—for example, including knuckles and the like as other joints in the region of the user's arm. Alternatively, or in addition, non-joint locations may also be used in the model where appropriate.

Using the camera, measurements can be made of the user's size and added to the skeletal model such that it more accurately resembles the user's body. Therefore in some embodiments the skeletal model comprises the height and dimensions of a user.

By providing such a model with appropriate constraints to characterise the relative motion of the joints (such as joint flexibility or limb length), a change in position of one part of the body may be related to a change in position of another. For example, the position of the elbow defines a set of positions which the wrist may occupy (as a result of a fixed forearm length and limited joint flexibility); if the position of the wrist is identified by a handheld peripheral to be in a position that is not in this set, then it can be deduced that the user's elbow has moved. In some embodiments, expected or average measurements for joint flexibility or limb length may be used (the latter of these being based upon a height measurement, for example). Alternatively, or in addition, measurements could be made—for example, asking a user to perform different actions to demonstrate flexibility and range of motion or the like in a calibration mode of the tracking system. In either case, it is apparent that the skeletal model may comprise information about the range of motion of the user's joints.

By using information constraining the skeletal model, a handheld peripheral may be able to provide information that is able to be used to update position information of the whole of the user's arm. A pair of such devices, each providing such information for a respective arm, may therefore be sufficient to also provide information about the position of the user's torso—by providing information about the position of each shoulder, it is possible to identify a user dropping their shoulder or the like. This may be particularly useful when a user is not facing the camera directly; in such situations camera-based tracking may become unreliable, but by using the peripheral motion data to update this tracking information useful tracking may still be provided.

In this manner, it is possible to deduce motion of numerous parts of the user's body using a small number of peripherals. While the number of peripherals may be increased to provide a greater amount of information, for example providing motion detectors for a user's ankles, this may be undesirable as it increases the amount of information that must be processed by the processing device as well as increasing the cost of peripherals that a user must own.

The peripherals may provide motion information at the same rate as the frame rate of the application that the user is using, although any rate may be appropriate. Below, a discussion is provided in view of a display that is updated at 120 Hz, and a camera that captures images at 30 frames per second; these numbers are entirely exemplary, of course, as it would be appreciated that any display frame rate or image capture rate may be appropriate.

If the peripherals also provide information at 120 Hz, then the input signals are received at the same rate as a frame rate of content displayed on a display associated with the motion tracking system. This means that the motion data from the peripherals can be used to update the information obtained from the camera three times (as the peripherals will provide data four times as often as the camera provides images) before a new set of information is generated by the camera-based tracking system. This is advantageous, as the tracking information is updated for each frame that is generated for display; this means that the user's body position is updated in each frame, and thus the motion of the avatar that is rendered may appear smoother and more responsive to a viewer.

If the peripherals provide information at 60 Hz, this means that the motion data from the peripherals can be used to update the information obtained from the camera once before a new set of information is generated by the camera-based tracking system. This is advantageous, as it means that the tracking information is updated for every other frame that is generated for display—this intermediate updating of the information will result in a smoother and more responsive rendering, albeit not to the same degree as the above example in which the tracking is updated for every frame.

If the peripherals provide information at 30 Hz, this means that the motion data from the peripherals is generated at the same rate as that of the tracking data from the camera-based tracking system. This motion data can be used to refine the tracking information of the camera based system, so as to improve the accuracy.

Alternatively, the motion data could be acquired at an time that is offset to that of the camera-based system; for example, the tracking data from the camera-based system could be acquired at frames 1, 5, 9, etc. . . . of the content for display, while motion data from the peripherals is acquired at frames 3, 7, 11, etc. . . . Therefore there is an update of the information obtained from the camera once before a new set of information is generated by the camera-based tracking system, even though the two systems acquire data at the same rate.

While this method in which the input signals are received at times offset from the times at which images are captured by the camera may be more useful when the motion data is obtained at the refresh rate of the camera in the camera-based tracking, this offset may be applied independently of the motion information acquisition rate.

Further to this, the peripherals may provide motion data less frequently than the camera frame rate (for example, 24 Hz—so updates at frames 2, 7, 12, etc. . . . ). In this case, not every piece of tracking information from the camera-based system may be updated using motion data from the peripherals. However, this may be advantageous in reducing the processing requirements for the tracking process whilst still providing some improvements to the accuracy of the tracking process.

A purpose of these tracking data updates is to allow for an improved tracking method in which the tracking is more responsive to a user's motion. This can in turn lead to a lower latency in updating the positions of at least parts of an avatar's body (the motion of which is dependent on that of the user) in a virtual environment. This means that a more natural and responsive behaviour of the avatar is provided.

In the example of FIG. 1, these advantages are extended primarily towards the motion of the arms, shoulders, and upper torso of the user due to the location of the peripherals. This may be sufficient in many arrangements, as if a user is in a virtual environment then these are the parts of the body that are most likely to be seen (as a user is unlikely to often look at their legs, whilst they will use their arms for interactions often). Additionally, it is these parts of the body that may be more commonly associated with high-frequency movements and thus are more susceptible to poor tracking resulting from high latency systems.

While the present disclosure refers primarily to a tracking system which utilises a skeletal model, any suitable tracking method may be used so long as it allows information from peripherals to be used to update the location information for parts of the user's body.

Figure 3:
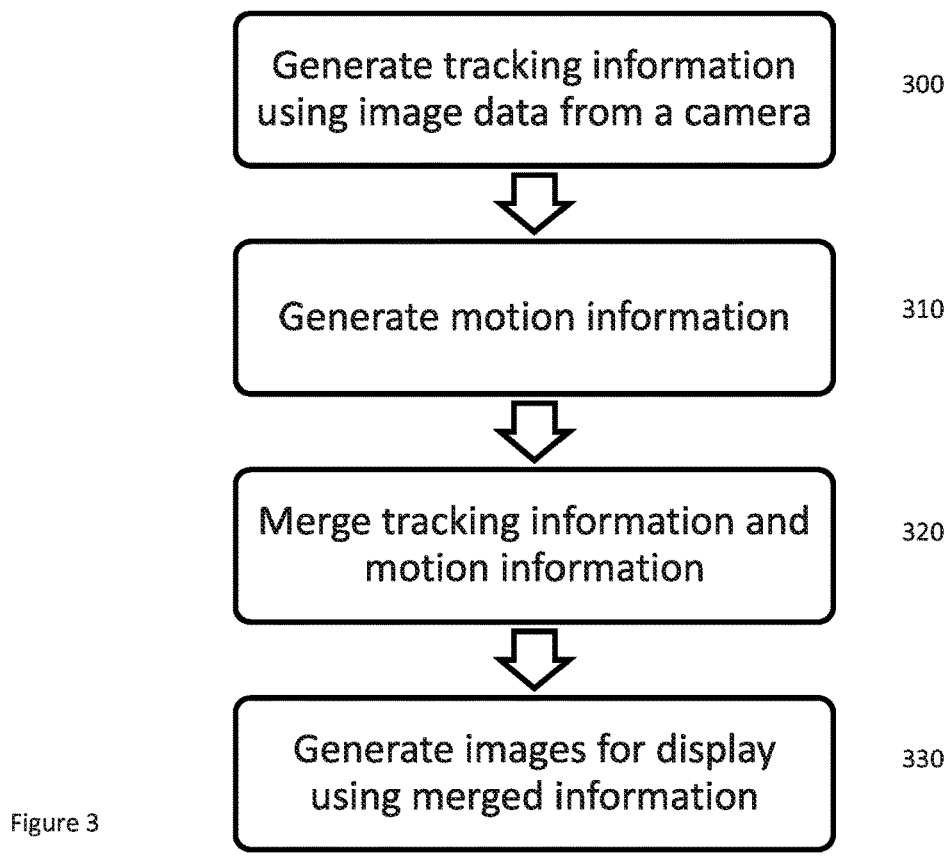
FIG. 3 schematically illustrates a body tracking method.

FIG. 3 schematically illustrates a method for rendering content based upon tracking information obtained from a data merge of body tracking information and peripheral motion information.

A step 300 comprises generating tracking information for a user using images of a user obtained with a camera. This may include image processing techniques, as described above, and use this information to update a skeletal model.

A step 310 comprises generating motion information for a user from input signals, for example obtaining position information from one or more peripherals associated with the user. The motion information may relate only to a user's head and/or hands, as in the example of FIG. 1 in which the user is provided only with handheld peripherals and an HMD that are operable to provide such motion information.

A step 320 comprises merging the generated tracking information and the generated motion information, wherein the motion information is used to modify at least a portion of the tracking information.

A step 330 comprises generating images for display in dependence upon the merged information. The image generation may comprise the rendering of an avatar that moves in a virtual environment in a manner that depends upon the user's motion in the real world.

Figure 4:
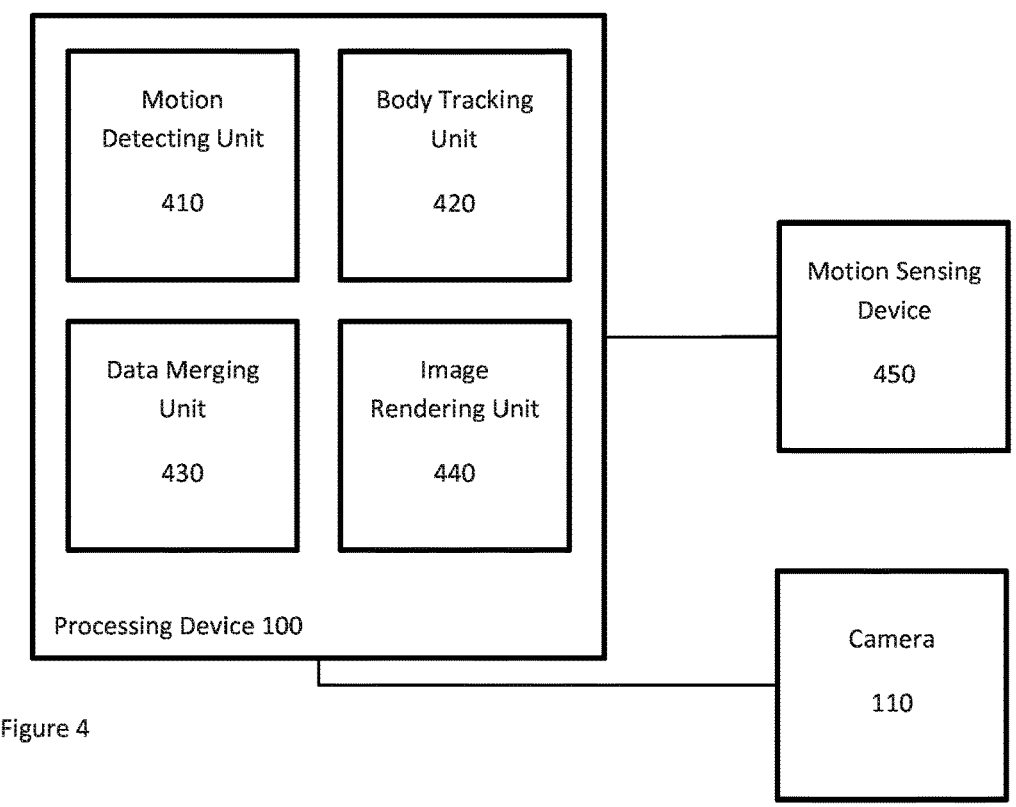
FIG. 4 schematically illustrates a motion tracking system.

FIG. 4 schematically illustrates a motion tracking system comprising a processing device 100, a motion sensing device 450 and a camera 110. The processing device 100 comprises a motion detecting unit 410, body tracking unit 420, data merging unit 430 and an image rendering unit 440. The location of each of these units as shown in FIG. 4 is entirely exemplary, and these units may be arranged in any suitable manner. For example, the motion detecting unit 410 could be located at the motion sensing device 450.

The motion detecting unit 410 is operable to generate motion information for a user from input signals.

The body tracking unit 420 is operable to generate tracking information for a user by using the images of the user captured by the camera. In some embodiments, the body tracking unit is operable to use images of the user captured by the camera to update a skeletal model.

The data merging unit 430 is operable to merge the generated tracking information and the generated motion information, wherein the motion information is used to modify at least a portion of the tracking information.

The image rendering unit 440 is operable to generate images for display in dependence upon the merged information.

The camera 110 is operable to capture images of the user, and the motion sensing device 450 is operable to sense motion using an accelerometer or the like.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A motion tracking system for tracking a user, the system comprising:
   a motion detecting unit operable to generate motion information for a user from input signals;
   a camera operable to capture images of the user;
   a body tracking unit operable to generate tracking information for the user by using the images of the user captured by the camera; and
   a data merging unit operable to merge the generated tracking information and the generated motion information, wherein the motion information is used to modify at least a portion of the tracking information, wherein the input signals are received at a different rate to that at which the camera is operable to capture images of the user.

2. The motion tracking system according to claim 1, comprising an image rendering unit operable to generate images for display in dependence upon the merged information.

3. The motion tracking system according to claim 2, wherein the image rendering unit is configured to generate the images by rendering of an avatar that moves in a virtual environment in a manner that depends upon the user's motion in the real world.

4. The motion tracking system according to claim 1, wherein the input signals are received from one or more peripheral devices associated with a part of the user's body, and indicate motion of the user's body.

5. The motion tracking system according to claim 1, wherein the input signals are received at a same rate as a frame rate of content displayed on a display associated with the motion tracking system.

6. The motion tracking system according to claim 1, wherein the body tracking unit is operable to use the images of the user captured by the camera to update a skeletal model.

7. The motion tracking system according to claim 6, wherein the skeletal model comprises the height and dimensions of a user.

8. The motion tracking system according to claim 6, wherein the skeletal model comprises information about a range of motion of the user's joints.

9. The motion tracking system according to claim 1, wherein the motion information relates only to the user's head and/or hands.

10. The motion tracking system according to claim 1, wherein the input signals are received at times offset from times at which images are captured by the camera.

11. The motion tracking system according to claim 1, further comprising a head-mountable display.

12. A motion tracking method for tracking a user, the method comprising:
generating, using a processing device, tracking information for a user using images of a user obtained with a camera;
generating, using the processing device, motion information for the user from input signals; and
merging, using the processing device, the generated tracking information and the generated motion information, wherein the motion information is used to modify the tracking information,
wherein the input signals are received at a different rate to that at which the camera is operable to capture images of the user.

13. The motion tracking method according to claim 12, comprising generating images for display in dependence upon the merged information.

14. A non-transitory computer-readable recording medium having computer readable instructions stored thereon, the instructions, when executed by a computer, cause the computer to perform a motion tracking method, the method comprising:
generating tracking information for a user using images of a user obtained with a camera;
generating motion information for the user from input signals; and
merging the generated tracking information and the generated motion information, wherein the motion information is used to modify the tracking information,
wherein the input signals are received at a different rate to that at which the camera is operable to capture images of the user.

15. The recording medium of claim 14, wherein the method further comprises generating images for display in dependence upon the merged information.

* * * * *